Dec. 26, 1967     G. RICHMOND     3,359,847
TAPERED RIVET
Filed March 15, 1967     2 Sheets-Sheet 1
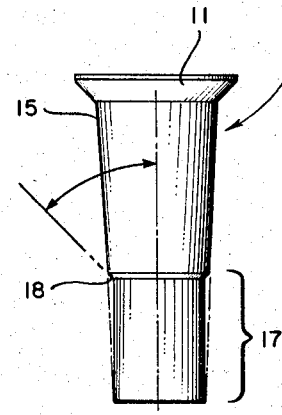
FIG_1
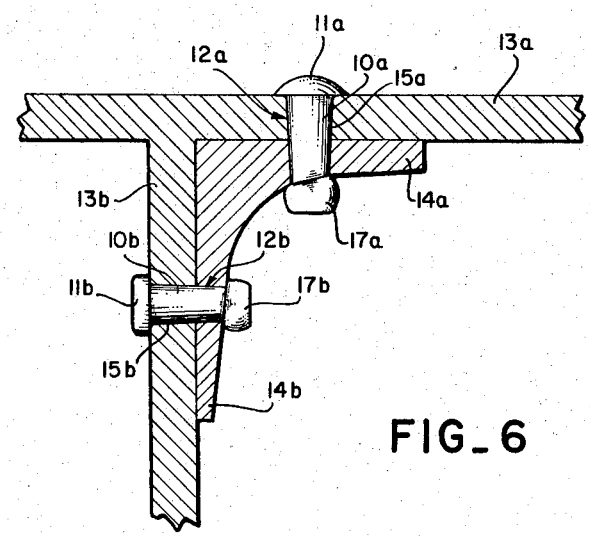
FIG_6
INVENTOR.
GUS RICHMOND
BY
George C. Sullivan
Agent Dec. 26, 1967      G. RICHMOND      3,359,847

TAPERED RIVET

Filed March 15, 1967      2 Sheets-Sheet 2

INVENTOR.
GUS RICHMOND

BY George C. Sullivan
Agent

United States Patent Office 3,359,847
Patented Dec. 26, 1967

3,359,847
TAPERED RIVET
Gus Richmond, 157 Plantation Road,
Smyrna, Ga. 30080
Filed Mar. 15, 1967, Ser. No. 633,649
5 Claims. (Cl. 85—37)

ABSTRACT OF THE DISCLOSURE

A headed rivet with a tapered grip for installation into a tapered opening; the dimensions of the tapered rivet grip and tapered opening providing an interference fit when the rivet is installed within the range of .006 and .025 inch per inch of rivet diameter with a maximum interference of .018 inch, and a bucktail portion length extending beyond the tapered opening when the rivet is installed of .60 to 1.25 times the rivet diameter at the exit plane of the tapered passage. One configuration has the bucktail portion tapered continuously with the grip taper so that the rivet diameter at the rivet end is no less than .90 times the rivet diameter at the exit plane of the tapered passage; and another configuration where the bucktail portion is substantially of constant diameter from substantially the exit plane to the rivet end.

---

This is a continuation-in-part of my copending application Ser. No. 464,453, filed June 16, 1965, and now abandoned.

This invention relates generally to fasteners employed to secure parts against relative movement that are predicated on a tapered shank principle in order to effect a connection of maximum strength and fatigue resistance, and more particularly to a rivet especially adapted to thus connect structural parts by means of an interference fit thereof with the material of the parts defining an undersized tapered hole whereby the material of the parts is stretched by the shank of the rivet when forcibly inserted or driven during its installation.

Tapered pins and bolts have heretofore been employed to advantage in stringent installations where a higher degree of rigidity is required between parts to be joined than is obtainable by conventional fasteners having uniform diameters. In such cases the tapered bolt is forcibly drawn into the undersized hole by the tightening of a nut coacting with the smaller, threaded end of the bolt and the parts thereafter clampingly secured by the nut acting in opposition to the head on the other end of the bolt. Thus, the length, taper and interference of the bolt must be such to permit the projection of the threaded end thereof beyond the parts for engagement with the nut. This constitutes a limitation in the general application of these tapered bolts inasmuch as an objectionably long bolt can result in some cases.

Additionally, tapered bolts are limited in that they must be of a minimum size (about 3/16 of an inch in diameter) to function effectively. In primary structural applications, sizes smaller than 3/16 of an inch result in untenable installation problems associated with excessive torques and net area strengths. Hence, in many applications, if employed, these bolts are larger than the companion structure requires and can be costly, especially from the weight standpoint.

Moreover, the tapered bolt and nut combination is undesirable in some fastener applications because of the complex installation problems it creates. Consider, for example, the manufacture of aircraft where the external skins thereof comprise multiple sheets or panels with stringers which must be secured substantially and continuously along their entire marginal edges and adjoining faces. Historically, this has been accomplished by riveting and high speed accurate equipment and techniques have been developed to make this operation compatible with mass production. The same result, if obtainable with the tapered bolt and nut combination, would first require the design, construction and development of corresponding equipment and techniques. At best, this makes the application of the tapered bolt concept to aircraft manufacture especially in the required smaller sizes a future possibility with little practicability.

Even assuming that such equipment and know-how could be developed, the tapered bolt and nut fastener imposes an additional weight penalty on the ultimate aircraft which conceivably could more than offset the potential gain to be had from improved structural integrity; the result would be a net loss. In the aircraft skin connections mentioned above the rivet requirements are usually less than 3/16-inch diameter which is below the minimum size that tapered bolts can be produced to function properly as hereinabove stated. When considering the large number of fasteners required in the entire aircraft skin, the aggregate weight of tapered bolts and nuts compared with that of conventional rivets becomes prohibitive.

The reliability of the bolt and nut as a fastener as compared with the integral rivet structure is another factor deserving attention. Under the loads and vibrations to which aircraft are subjected, some positive retention means would be required to ensure against retrograde movement of the nut on its bolt. This introduces more problems and expense in the ultimate assembly as well as makes reliability of this assembly less certain.

This retention or locking problem is compounded by the fact that in many installations the interior of the aircraft is obstructed by bulkheads, ribs, stiffness, etc., adjacent the fastener making it difficult to gain access to the nut in order to tighten it. Special wrenches or tools are therefore required. Also in some installations the internal surface of the skin against which the nut abuts is angularly disposed, curved or otherwise not perpendicular to the bolt requiring a special nut design to ensure flush surface contact. In some cases resort has been made to compensating spacers or washers resulting in additional parts and accompanying logistic problems being encountered.

The present invention therefore primarily contemplates a rivet incorporating the tapered shank concept and clamping heretofore developed in the tapered bolt, and before that in the tapered pin where the primary object is to prevent slippage between the parts joined. Hence, all the advantages of the rivet as a fastener, as well as the heretofore developed equipment, techniques and know-how in its use, particularly in the mass production of assemblies, are realized. At the same time, the advantages of the tapered shank concept are obtained in high performance connections where neither the conventional rivet nor the tapered bolt is practical.

Essentially, the rivet herein proposed is formed by an enlarged end or head, a tapered shank, and a deformable end portion or bucktail (the portion of the rivet adapted to extend beyond the parts or sheets to be joined thereby). The taper of the shank corresponds to that of a passage in the sheets to be joined thereby while the diameter thereof is larger than that of the passage to produce a predetermined interference therebetween. The cross sectional dimension of the bucktail at its terminus is less than that of the adjacent end of the shank. Where the material of the rivet has a low yield strength relative to that of the parts to be joined, the bucktail has a taper that is substantially continuous with that of the shank; however, where a relatively high yield strength rivet material is employed, the bucktail is pronouncedly angular or offset from the shank, preferably by a beveled surface. In the latter case, the cross sectional dimension of the bucktail is preferably uniform at every point along its length.

With the above and other objects in view as will be apparent, this invention consists in the construction, combination and arrangement of parts all as hereinafter more fully described, claimed and illustrated in the accompanying drawings wherein:

FIGURE 1 is a longitudinal view of a rivet designed and constructed in accordance with the teachings hereof, the bucktail portion of the rivet being shown with a beveled surface where it joins the tapered shank with the alternate form of a continuous taper illustrated by phantom lines;

FIGURE 2 is a transverse section through a pair of sheets or skins to be interconnected by the rivet of FIGURE 1 to show the initial position of the skins with holes therein in alignment to define a tapered passage corresponding to the tapered shank of the rivet and slightly undersized to restrict entry of the rivet therein, the ultimate position of the passage walls after the rivet (regardless of which form of bucktail used) is secured being shown in phantom lines;

Figure 2:
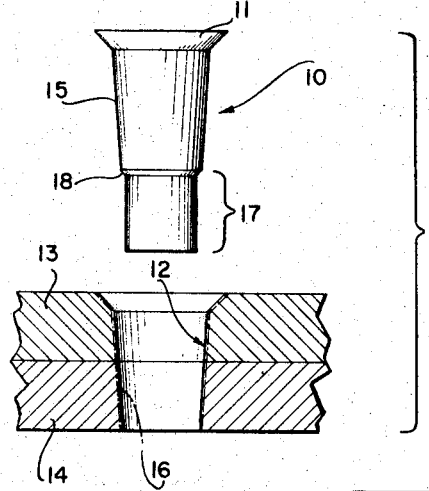
Figure 3:
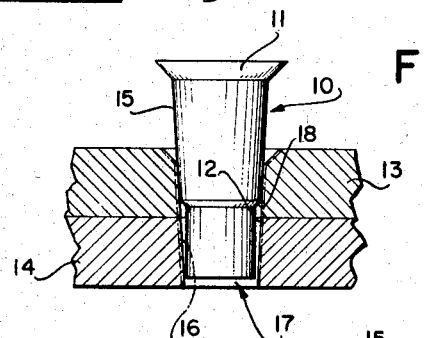
FIGURE 3 is a similar view to show the rivet after it has been placed in the tapered passage in the skins and prior to permanently securing it therein.
Figure 4:
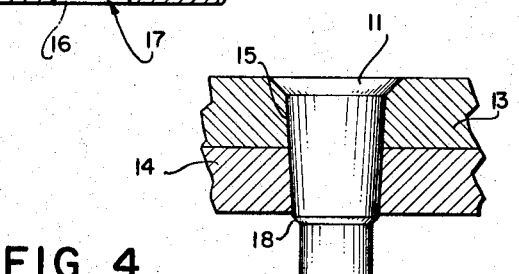
FIGURE 4 is a similar view to show the rivet fully inserted in the passage and the resulting interference generated by expanding the passage to the diameter indicated by the phantom lines in FIGURES 2 and 3.
Figure 5:
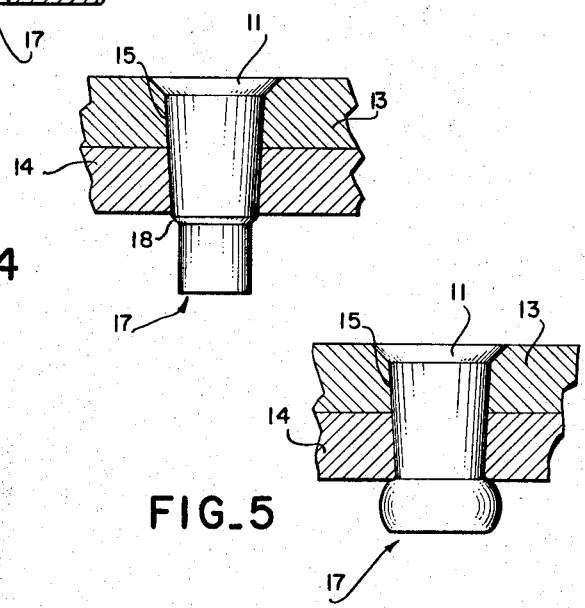

FIGURE 5 is a similar view to show the ultimate position of the rivet in the passage and after it has been compressed or bucked whereby the skins are secured against relative movement in all directions thereby; and FIGURE 6 is a transverse section through a panel with an internal stringer to show modified forms of the rivet illustrated in FIGURES 1 to 5 as applied in restricted or obstructed areas and where the associated surfaces are not perpendicular to the longitudinal centerline of the rivet, which is typical of many aircraft installations.

Referring more particularly to FIGURES 1 through 5 of the drawings, 10 designates a preferred form of rivet as contemplated by the invention including a head 11 adapted to lie flush within a countersunk passage 12 that pierces a pair of skins 13 and 14 to be ultimately connected thereby. The passage 12 is tapered corresponding to a tapered shank 15 constituting the medial portion of the rivet 10 and undersized with reference thereto establishing a predetermined interference 16 not to exceed .018 inch and preferably in the range of .006 and .025 inch per inch of diameter along the length of the shank 15 and the passage surface.

At its outer end the rivet 10 terminates in a bucktail section 17 having a length in the range of .60 to 1.25 times the diameter of the shank 15 at the exit of the passage 12 when the rivet 10 is forcibly inserted therein; it being understood that a bucktail section 17 having a length of .80 to 1.25 times the diameter of shank 15 at the exit plane of passage 12 is believed the most preferable to fully attain all the benefits of this invention, but that partial benefits of the invention are attained with rivets 10 having a bucktail section 17 length as little as .60 times the diameter of shank 15 at the exit plane of passage 12. The cross sectional dimension of this bucktail 17 at its outer extremity prior to being deformed or bucked is no less than 90 percent of that of the shank 15 at the exit of the passage 12; and preferably in the order of 90 to greater than 99 percent (but less than 100 percent) of that of shank 15 at the exit plane of passage 12. Generally, the shank 15 and bucktail 17 have a continuous taper (indicated by the phantom lines in FIGURE 1) throughout the length of the rivet 10, the material of the rivet being selected where possible with a low yield strength relative to the material of the sheets or skins 13 and 14.

Where such is not the case, i.e. where the rivet material has a high yield strength relative to the material of the skins 13 and 14, the transverse dimension of the rivet 10 is reduced in the area where the bucktail 17 joins the shank 15 to ensure deformation of the bucktail 17 during the bucking operation without any appreciable permanent deformation of the shank 15. In the illustrated embodiment, this is effected by means of and through an offset, preferably a beveled surface 18 disposed at an acute angle, indicated by the arc, FIGURE 1, to the centerline of the rivet 10 at its junction with the shank 15. In this form the bucktail 17 has a uniform cross sectional dimension throughout its length.

In any case the transverse dimension of the bucktail 17 at its outer end is a predetermined percentage smaller than that of the shank 15 at its smaller end. Moreover, the stiffness (elastic character) of the rivet material is a factor which must always be considered and is usually such that it approximates or exceeds that of the parts to be joined. These factors coupled with a matched interference and bucktail length within the range set forth above constitute salient features of a successful rivet as contemplated by this invention.

In the aircraft skin application a relatively strong (i.e. stress bearing) metal such as a structural aluminum alloy, titanium, a titanium alloy or the like is employed. By "structural" is meant heat-treatable and strain-hardenable, referred to in the trade as wrought materials. In this case the metal of the rivet would have the following properties: a yield strength of between 60,000 and 160,000 pounds per square inch (p.s.i.), a minimum stiffness (elastic) of about 15 million pounds per square inch (p.s.i.), and a toughness (reflected by Charpy impact) of at least 10 foot-pounds, rotating beam fatigue of 100,000 cycles or better at 40 percent ultimate tensile strength and a stress concentration factor of 3. One such metal is commercially pure titanium or an annealed alloy of titanium. Titanium is mentioned because it is also known to have a practical immunity to corrosion at ambient conditions and in the presence of aluminum, titanium or titanium alloys which as stated is a type of skin metal employed in aircraft.

Thus designed and fabricated, the rivet 10 may be installed (i.e. driven and bucked) by any conventional equipment, such equipment or apparatus being outside the scope of this invention. The invention is limited to the rivet 10, per se, and the predetermined tapered passage within the parts to be joined thereby. The length of the tapered shank 15 is such as to be substantially coextensive with the passage 12 when the rivet 10 is forcibly inserted therein and prior to being bucked. Thus, as the rivet 10 is forcibly inserted and secured in the tapered passage 12, the interference 16 between the surface of the shank 15 and the walls defining the passage 12 produces a rigid interconnection of the skins 13 and 14 with interrelated built-in strains or stresses. This interference 16 is designed and intended to work the material of the skins 13 and 14 up to but not appreciably exceeding their elastic limit whereby the ultimate assembly constitutes a tight, integral, virtually homogeneous structure with internal prestrains or prestresses of precise magnitude before application of external loads or environments.

FIGURE 6 shows slightly modified rivets 10a and 10b each of which has a tapered shank 15a and 15b, respectively, for interference fit with its associated undersized, tapered passage 12a and 12b. The rivets 10a and 10b are identical for all intents and purposes to the rivet 10, the single difference being their heads 11a and 11b which are not necessarily tapered as in the case of head 11 for countersunk installations and the ultimate form of their respective bucktails 17a and 17b. In this application, while the skin 13a and underlying stringer 13b each defines an outer surface that is perpendicular to the longitudinal centerline of the associated rivets 10a and 10b, the arms 14a and 14b of an underlying web define angularly disposed or arcuate surfaces which cause the bucktails 17a and 17b to deform in a different manner when bucked than in the case of bucktail 17.

While a specific rivet design and structure has been hereinabove illustrated and described, certain modifications and alterations as will appear obvious to those skilled in the art may be made without departing from the invention. The appended claims are intended to cover all such modifications and alterations that fall within the true spirit and scope of the invention.

What is claimed is:

1. A rivet adapted to secure structural parts disposed in surface to surface contact one with another and pierced by holes in alignment to define a tapered passage for said rivet comprising a tapered shank substantially coextensive in length with said passage when ultimately inserted therein, the material of said rivet having a predetermined stiffness and yield strength relative to that of said parts and the taper of said shank corresponding to that of said passage continuously along the entire length thereof with the diameter of said shank being oversized with reference to that of the passage to produce a predetermined interference within the range of .006 and .025 inch per inch of diameter therebetween with a maximum of .018 inch interference, said interference being that occurring when the rivet is fully inserted in said passage, an enlarged head on the larger end of said shank, and a bucktail section at the other end of said shank extending beyond the exit of the passage when inserted as aforesaid, said bucktail section having a cross sectional dimension adjacent its outer end that is within the range of 90 percent to greater than 99 percent and less than 100 percent that of the said shank at the passage exit aforesaid and a length within the range of .60 and 1.25 times the diameter of said shank at said passage exit.

2. The rivet of claim 1 fabricated of a metal of uniform strength and having structural properties of titanium and its alloys.

3. The rivet of claim 1 including a flat beveled surface disposed at an acute angle to the centerline of the rivet connecting said shank to said bucktail section.

4. The rivet of claim 3 wherein said bucktail section has a substantially uniform cross sectional dimension throughout its length.

5. A rivet adapted to secure structural parts disposed in surface to surface contact one with another and pierced by holes in alignment to define a tapered passage for said rivet comprising a tapered shank substantially coextensive in length with said passage when ultimately inserted therein, the material of said rivet having a predetermined stiffness and yield strength relative to that of said parts and the taper of said shank corresponding to that of said passage continuously along the entire length thereof with the diameter of said shank being oversized with reference to that of the passage to produce a predetermined interference within the range of .006 and .018 inch per inch of diameter therebetween when the rivet is fully inserted in said passage, an enlarged head on the larger end of said shank, and a bucktail section at the other end of said shank extending beyond the exit of the passage when inserted as aforesaid, said bucktail section having a cross sectional dimension adjacent its outer end that is within the range of 90 to 98.3 percent that of the said shank at the passage exit aforesaid and a length within the range of .80 and 1.25 times the diameter of said shank at said passage exit.

References Cited

UNITED STATES PATENTS

| | | | |
|---|---|---|---|
| 1,934,780 | 11/1933 | Van Haltesen | 85—37 |
| 2,196,144 | 4/1940 | Eckler | 85—37 |
| 2,482,391 | 9/1949 | Webster | 85—37 |
| 2,672,107 | 3/1954 | Widman | 85—37 |
| 2,958,230 | 11/1960 | Haroldson | 85—37 |
| 3,034,611 | 5/1962 | Zemzic | 85—1 |
| 3,271,058 | 9/1966 | Anderson | 287—189.36 |

FOREIGN PATENTS 679,962    8/1939    Germany.

MARION PARSONS, JR., *Primary Examiner.*